United States Patent
Mazega Figueredo et al.

(12)

(10) Patent No.: US 12,498,371 B2
(45) Date of Patent: Dec. 16, 2025

(54) FORMULATION FOR TOTAL AND DIFFERENTIAL COUNTING OF LEUKOCYTES IN LIQUID MEDIUM AND METHOD OF MAKING AND USING SAME

(71) Applicant: Hi Technologies Ltda., Curitiba (BR)

(72) Inventors: Marcus Vinicius Mazega Figueredo, Curitiba (BR); Sergio Renato Rogal Júnior, Curitiba (BR); Aléxia Thamara Gasparin, Curitiba (BR); Claudiane Isabel Franco Araujo, Curitiba (BR); Erika Bergamo Santiago, Curitiba (BR); Luís Felipe Hartmann, Curitiba (BR); Adriano Artur Timm, Curitiba (BR); Ivan Lucas Reis Silva, Curitiba (BR); Flavia Zhu Teng, Curitiba (BR); João Victor Predebon, Curitiba (BR)

(73) Assignee: Hi Technologies Ltda, Curitiba (BR)

( * ) Notice: Subject to any disclaimer, the term of this patent is extended or adjusted under 35 U.S.C. 154(b) by 524 days.

(21) Appl. No.: 18/069,458

(22) Filed: Dec. 21, 2022

(65) Prior Publication Data
US 2023/0204580 A1    Jun. 29, 2023

(30) Foreign Application Priority Data
Dec. 23, 2021    (BR) .......................... 1020210262907

(51) Int. Cl.
| | | |
|---|---|---|
| *G01N 33/569* | (2006.01) | |
| *G01N 15/14* | (2006.01) | |
| *G01N 15/1434* | (2024.01) | |
| G01N 15/01 | (2024.01) | |
| G01N 15/10 | (2006.01) | |

(52) U.S. Cl.
CPC ... *G01N 33/56972* (2013.01); *G01N 15/1434* (2013.01); *G01N 15/1459* (2013.01); *G01N 2015/011* (2024.01); *G01N 2015/016* (2024.01); *G01N 2015/1006* (2013.01); *G01N 2015/1477* (2013.01)

(58) Field of Classification Search
None
See application file for complete search history.

(56) References Cited

U.S. PATENT DOCUMENTS

| | | |
|---|---|---|
| 10,775,379 B2 | 9/2020 | Wu |
| 2006/0210428 A1 | 9/2006 | Lindberg et al. |
| 2018/0370929 A1 | 12/2018 | Quintino De Olivera et al. |

FOREIGN PATENT DOCUMENTS

| | | |
|---|---|---|
| BR | PI0608340 A2 | 12/2009 |
| BR | 9903325 B1 | 12/2010 |
| CN | 103398935 A | 11/2013 |
| EP | 0743519 A2 | 11/1996 |
| WO | WO2017100882 A1 | 6/2017 |

OTHER PUBLICATIONS

Azer Scientific, Inc., "Turk's Blood Diluent Safety Data Sheet", Rev 2, Revised: Apr. 1, 2021; 5 pages.

*Primary Examiner* — Xiaoyun R Xu
(74) *Attorney, Agent, or Firm* — Calderon Safran & Wright PC; Corinne Marie Pouliquen

(57) ABSTRACT

The invention relates to a formulation for total and differential counting of leukocytes for use in clinical analyses, in particular hemograms, to promote instantaneous differential staining of leukocytes in liquid medium, allowing greater practicality and agility in the total and differential counting of leukocytes. The practicality and agility are related to the use of a single dye for two parameters, eliminating the need for a smear. It results in a satisfactory effect for staining cells in suspension, staining the nucleus and cytoplasm of leukocytes in different shades, allowing their visualization under an optical microscope or in Point-of-Care image processing devices. It uses easily accessible raw materials, including cresyl acetate violet, ethyl alcohol, sodium and potassium chlorides, sodium hydroxide, acetic acid, triton X and deionized water, presenting a simple manufacturing process and low cost.

4 Claims, No Drawings

FORMULATION FOR TOTAL AND DIFFERENTIAL COUNTING OF LEUKOCYTES IN LIQUID MEDIUM AND METHOD OF MAKING AND USING SAME

CROSS-REFERENCE TO RELATED APPLICATIONS AND CLAIM TO PRIORITY

This application is related to Patent Application No. 10 2021 026290 7 filed Dec. 23, 2021, in Brazil, the disclosure of which is incorporated herein by reference and to which priority is claimed.

FIELD OF THE INVENTION

The invention refers to a formulation of a solution for total and differential leukocytes count, which can be applied in clinical analytical tests, in particular hemograms, able to promote instantaneous differential staining of leukocytes in liquid medium, allowing greater practicality and agility in the total and differential count. For this, image processing is used in Point-of-Care devices or manual counting in an optical microscope. The formulation can preserve the morphological characteristics of the different leukocyte types, bringing the advantages of simplicity in operation and low cost.

BACKGROUND OF THE INVENTION

As is currently known in clinical analytics, the blood count test is performed in hematological analyzers, which use conventional methodologies of resistivity-impedance and/or flow cytometry to provide the hematological parameters that make up the blood count test. These types of equipment have a high cost and require high maintenance, and, because of that, they are not used in places of low demand. In these cases, the manual method is the most adequate. However, in order to perform the blood count manually, several steps are necessary, such as counting cells in a hemocytometer, preparing a blood smear, staining the microscope slide, a trained professional for the differential analysis of leukocytes, in addition to the joint observation of erythrocytes and platelets in the slide.

Dyes commonly used in clinical practice include Giemsa, Leishman, Romanowsky, Wright and fast panoptic, however, these dyes do not produce a satisfactory effect for staining cells in suspension. Thus, for a sample of interest to be stained with these reagents, it needs to be fixed and dried on a microscope slide, and then undergo the staining process.

For leukocyte counting in liquid medium, Turk's liquid is a commercially available diluent solution indicated for total white blood cell count. However, with this solution, it is not possible to perform a differential leukocyte count, considerably limiting a possible clinical diagnosis.

Searching the national and international patent databases, the following revelations were found.

Patent PI 9903325-9 "Reagent for measuring hemoglobin and determining leukocytes in a blood sample" deals with a reagent for measuring hemoglobin and determining leukocytes in a blood sample, comprising at least one cationic detergent, a glycosidic compound, an inorganic salt, including sodium chloride in amounts ranging from approximately 0.0008% to 1.5000% by mass, and an organic or inorganic buffer to keep pH between 5 and 8 to identify and quantify subpopulations of lymphocytes, monocytes and neutrophils, or in its other modality, to keep pH between 8 and 12 to identify and quantify polynuclear eosinophils.

However, the reagent of the invention of PI 9903325-9 is limited to be used in automated equipment, not allowing manual counting or differential visualization in an optical microscope.

Patent PI 0608340-4, entitled "Sample Obtaining Device, Method and System for the Volumetric Enumeration of White Blood Cells", discloses a device for counting white blood cells and a reagent disposed in dry form on a surface defining the measurement cavity. That reagent comprises a hemolysis agent and a labeling agent. The main points of the way in which the device and the reagent were prepared were the practicality and speed of obtaining the results of the white cell count, since the blood sample reacts in a matter of minutes inside the device without the need to previously prepare the sample allowing fast image analysis. However, the reagent is made available inside the device in dry form, being necessary to make use of fast evaporating solvents before the sample is added for analysis, preferably organic solvents and in particular methanol. However, methanol requires care in its handling as it is flammable and toxic. Another modality of the device allows the use of solvents with a lower evaporation rate, as it is dried in an open manner.

Therefore, patent PI 0608340-4 has the disadvantage of needing to dry the reagent previously dissolved in a solvent, selected from one modality of the device, on a narrow surface before receiving the sample and the inconvenience of using methanol in its preferred modality. In addition, PI 0608340-4 does not define the amounts of compounds used in the reagent for analysis, which makes it impossible to reproduce by a technician in the field.

Patent application BR 112018011173-2, entitled "Water-based Cell Staining Composition, Method for Preparing Same and Use Thereof, Cell Sample Preparation and cell counting Methods", and respective international publication WO2017100882, discloses a formulation free of cyanide, which does not produce particle agglutinates and makes viable the differential staining in a liquid medium. This invention allows performing the lysis of red blood cells, if necessary, as well as dispensing with the preparation of blood distention, performing the total and differential count of leukocytes simultaneously in a Neubauer chamber or similar device. The composition comprises combinations of Methyl Green, Pyronine Y and Fluorescein dyes that may or may not be associated with a lysing agent, which acts in one step in a liquid medium. An alcoholic concentration, with ethanol or methanol, is less than or equal to 35% by mass.

Although what was revealed in BR 112018011173-2 was a big step in leukocyte analysis as it does not require a smear and does not require automated equipment that requires a large volume of analysis to compensate for its cost, the disclosed formulation has the disadvantage and the inconvenience of using substances that require chloroform for their purification, such as methyl green, in addition to substances that are difficult to access and have a high cost, such as Pyronin Y.

U.S. Pat. No. 10,775,379, "Reagents, Systems, and Methods for Analyzing White Blood Cells" includes methods, systems, and reagents for analyzing white blood cells in order to identify, classify, and quantify white blood cells and their subpopulations in a sample through an automated equipment. The reagent contains fluorescent dyes, antimicrobial agents, buffering agents or chloride salts in up to 0.5% by mass, erythrocyte lysing agent and surfactants. The reagent is prepared in two steps, initially the fluorescent dye is dissolved in an organic solvent, and in the second step this solution of dye and organic solvent is dissolved in an aqueous medium, and additional compounds may be present in the aqueous medium to promote the lysis of red cells.

The reagent of U.S. Pat. No. 10,775,379 is designed to be used in automated equipment, not allowing cell visualization under an optical microscope, and uses high-cost fluorescent dyes and additional care in its formulation.

Patent CN103398935 discloses a method and a kit for differential leukocyte counting. The kit consists of reagent A and reagent B and can be used in automated equipment, containing potassium and sodium chloride salts ranging from 3 to 8 g/l. Reagents A and B are mixed with a blood sample in which erythrocyte fragments are dissolved and the leukocyte membrane is punctured so that the dyes (eosin for A and methylene blue for B) quickly enter the cytoplasm, but the leukocyte membrane is not destroyed and the leukocyte shape is kept.

However, there is the inconvenience of using formaldehyde or glutaraldehyde as a stabilizer for reagents A and B, and the disadvantage of requiring two different dyes to stain the leukocytes. Furthermore, the kit is not suitable for viewing under a microscope.

Patent EP0743519 discloses a method and a reagent composition for differential counting of leukocytes in whole blood samples, fresh or not, based on the intrinsic peroxidase activity of leukocytes. The invention is particularly applicable to blood stored at room temperature for up to 48 h and designed for analyzes performed in automated or semi-automated hematology analyzers and in flow cytometry systems. In that patent, formulations are disclosed that make use of inorganic salts such as potassium chloride and sodium chloride, antimicrobial agents, and non-ionic surfactants such as Triton X in amounts ranging from 0.09 to 1.5 g/l.

However, the invention described in Patent EP0743519 was designed to be used in automated or semi-automated equipment, not being useful for viewing under an optical microscope, and there is also the inconvenience of using formaldehyde or paraformaldehyde to fix white cells.

Thus, the solutions currently available that use a combination of dyes present an increase in the possibility of precipitates and a reduction in their stability, in addition to a high cost associated with raw materials or the complex manufacturing process, or the available solutions do not allow observation and differential counting of leukocytes by manual methods, by the technique of optical microscopy.

SUMMARY OF THE INVENTION

The invention was developed to overcome the disadvantages, inconveniences and limitations through improvements of the diluent and dye solution for the hemogram process, manually or by image processing in Point-of-Care devices, using a leukocyte dye in a liquid medium, allowing for the total and differential leukocyte count to be performed in the same process step without altering the leukocyte morphology. The practicality and agility are related to the use of a single dye for two parameters, eliminating the need for a smear. It results in a satisfactory effect for the staining of cells in suspension, staining the nucleus and cytoplasm of leukocytes in different shades, allowing visualization in an optical microscope or in image processing devices, and resulting in simplified analysis procedures. In addition, its manufacture is simple, of low cost and uses easily accessible raw materials.

Prior art methods present the following technical problems that were solved by the invention as follows:

a) For a sample of interest to be stained using Giemsa, Leishman, Romanowsky, Wright and fast panoptic dyes, it must be fixed and dried on a microscope slide, that is, to perform the blood count manually, several steps are necessary, such as hemocytometer cell count, blood smear preparation, slide staining and trained professional for leukocyte differential analysis. Thus, there is the problem of a process with many steps required for analysis. The problem was solved by the formulation of the invention, which can promote instantaneous differential staining of leukocytes in liquid medium and allowing for the total and differential counting of leukocytes to be performed in the same process step.

b) Prior art methods use materials that are difficult to access and with manufacturing processes that can be too complex. In addition, the association of dyes can compromise the stability of the solution, leading to the generation of precipitates that compromise the results of the analysis. Problem solved by the invention with the use of a single dye and with a simplified manufacturing process; and c) Priorities that use two dyes or two different solutions present the problem of needing two procedural steps before analysis, a first step to lyse red cells and a second step to stain the desired cells (leukocytes), and only after said step it is possible to perform analysis, or, in other modalities, it is needed a first step of staining the cytoplasm and a second step of staining the leukocyte nucleus so that the analysis can then be carried out. This problem was solved by the formulation that, with a single solution, lyses red blood cells and stains the nuclei and cytoplasm of leukocytes in different shades of purple, allowing the total and differential leukocyte count to be performed after a single step.

The development of the product of the invention started from the idea of producing a unique solution that allowed for the counting of blood cells in a liquid medium. However, the different proportions in which erythrocytes, platelets and leukocytes are present in the bloodstream required for a specific solution for leukocyte counting to be developed, especially considering the lower proportion of leukocytes compared to other blood cells. Aiming to keep the idea of simplicity and practicality, a dye capable of staining cellular structures and a surfactant that promoted the lysis of erythrocytes and that allowed the dye to enter the interior of the leukocytes was studied. For this, exhaustive and expensive research and tests were carried out with the dye's toluidine blue, methylene blue, eosin yellowish, eosin Y yellowish, methyl green, pyronine, fluorescein, cresyl acetate violet and cresyl blue. As a conclusion of these research, the dye with the best results was cresyl acetate violet. This dye caused the nucleus and cytoplasm of leukocytes to be stained in different shades of purple, enabling the identification, and counting of leukocyte cells. In addition, this dye remained stable in solution when associated with the hemolyser (surfactant). Other dyes tested can also be used, as already known from the prior art, but without the advantages that cresyl violet presents. It is worth mentioning that cresyl acetate violet can be diluted in water or in ethyl alcohol, but tests have shown that the best results are promoted by ethyl alcohol. To lyse the erythrocytes, the surfactants quaternary ammonia, saponin, tween 20 and Triton X (t-Octylphenoxypolyethoxyethanol) were tested. Of the tested surfactants, Triton X, a non-ionic surfactant with chemical formula $C_{2n}H_{4n}O_n$ $(n=9, 10)$, showed the best results, especially for being able to lyse erythrocytes, without compromising the morphology of leukocytes and without promoting precipitation of the associated dye. During the product development research, the solution was also tested in the blood of rodents and pets (such as dogs, cats, and horses), working perfectly for the total and differential leukocyte count, and can also be applied in the branch of veterinary clinical analysis. In addition, the stability of the solution when stored for extended periods was studied, and it was found that the solution of the invention remains stable for a period of up to 4 months, provided it is protected from light and kept at room temperature (10 to 25° C.).

DETAILED DESCRIPTION OF THE PREFERRED EMBODIMENT(S)

To produce dye formulation for total and differential leukocyte count in liquid medium (final composition), three steps are necessary, described below:

A1) Stage of production of the dye solution, with the dilution of the appropriate amount of cresyl acetate violet dye in absolute ethyl alcohol (anhydrous ethyl alcohol). After this process, the resulting dilution is reserved for 1 hour, protected from light, since it is photosensitive. For best results, then this dye solution can be filtered through filter paper No. 1 or, preferably, No. 5. Then, deionized water is added to the dilution;

A2) Stage of producing the hemolyzing solution, with the dilution of the appropriate amounts of sodium chloride (NaCl), potassium chloride (KCl) in deionized water, followed by the addition of an appropriate amount of 1M (1 molar) sodium hydroxide solution (1 molar), glacial acetic acid and Triton X. Then, the solution is homogenized on a thermal magnetic plate heated to 50° C., or an equivalent procedure, until the complete dilution of all components; and A3) Stage of preparation of the formulation for total and differential count of leukocytes in liquid medium (final composition), mixing 1 part by volume of the dye solution with 9 parts by volume of the hemolyzing solution. pH must be between 4.0 and 6.0 for correct operation. Its storage must be protected from light.

The technological functions of each component in the final composition are described below:

B.1) Cresyl acetate violet is a basic dye and is used to stain the cellular structures of leukocytes. Used with high purity (analytical grade), it has a molar mass of 321.33 g/mol and CAS number 10510-54-0. In insufficient amount, there will be no satisfactory cell staining, which will prevent leukocyte differentiation, and in excess, it decreases the stability of the solution and can form precipitates that interfere negatively in the analysis;

B.2) Sodium chloride (NaCl) is a salt added to reduce the amount of background residues generated by the lysis of erythrocytes, that is, to keep these undetectable residues in suspension. Used with high purity, it has a molar mass of 58.44 g/mol and CAS number 7647-14-5. The final composition works without this salt; however, the results are better when the appropriate amount is added, in excess it prevents the erythrocytes from being lysed;

B.3) Potassium chloride (KCl) is a salt also added to reduce the amount of background residues generated by the lysis of erythrocytes, that is, to keep these undetectable residues in suspension. Used with high purity, it has a molar mass of 74.56 g/mol and CAS number 7447-40-7. The final composition works without this salt; however, the results are better when the appropriate amount is added, in excess it prevents the erythrocytes from being lysed;

B.4) 1M sodium hydroxide solution has the function of assisting in the erythrocyte lysis process and assisting in the stability of the final composition. This sodium hydroxide solution is made using commercially available deionized water and contains 1 mol of high purity sodium hydroxide in 1 liter of solution. The final composition works without the addition of 1M sodium hydroxide solution, but tests have shown that the results are better when added in the proper amount. In excess, it causes changes in the cellular morphology of leukocytes, negatively interfering with the analyses;

B.5) Glacial acetic acid (absolute) has the function of helping in the process of lysis of erythrocytes and also of keeping the lysed cell particles in suspension. Used with a high degree of purity, it has a molar mass of 60.05 g/mol and CAS number 64-19-7. The final composition works without the addition of acetic acid; however, the results are better when added in an appropriate amount, in excess it prevents the leukocytes from being satisfactorily stained, impairing the analysis;

B.6) Triton X (t-Octylphenoxypolyethoxyethanol) is a commercial non-ionic surfactant with chemical formula $C_{2n}H_{4n}O_n$ $(n=9, 10)$ used to lyse erythrocytes. In insufficient amounts, the lysis of erythrocytes ceases to occur, in excess there will be lysis of all cells, which will prevent the visualization and counting of white blood cells;

B.7) Absolute ethyl alcohol is used as a solvent for the dye. Used with high purity, with a molecular mass of 46.07 g/mol and CAS number 64-17-5. It is possible to use the final composition without ethyl alcohol, however the dye remains more stable, without precipitating when ethyl alcohol is added in an appropriate amount, in excess it causes morphological changes in leukocytes; and B.8) Deionized water, which is the main solvent in the final composition. In insufficient quantity, will cause lysis of all cells, preventing the visualization and classification of white blood cells. In excess, erythrocyte lysis ceases to occur.

Exhaustive research and practical tests were carried out to determine the maximum and minimum amounts of each component used in the formulation for total and differential leukocyte count in liquid medium. All tests were performed following the same methodology and the values presented for the components are indicated percentage by mass.

The test methodology was as follows: a 1 µl sample of fresh capillary blood was diluted and homogenized in 9 µl of the final composition. Subsequently, 10 µl of this mixture was inserted into a hemocytometer for evaluation under an optical microscope. Tests 1 to 25 were performed to determine the minimum and maximum amount and also the preferred formulation with the best result.

Tests 1 to 4 determined the minimum and maximum amount of cresyl acetate violet are listed in table 1.

TABLE 1

Tests 1 to 4 to determine amounts in % by mass of Cresyl Acetate Violet.

| Component | 1 | 2 | 3 | 4 |
|---|---|---|---|---|
| Violet Cresyl Acetate | 0.0027 | 0.0028 | 0.4017 | 0.4018 |
| Ethyl alcohol | 1.5803 | 1.5803 | 1.5803 | 1.5803 |

TABLE 1-continued

Tests 1 to 4 to determine amounts in % by mass of Cresyl Acetate Violet.

| Component | 1 | 2 | 3 | 4 |
|---|---|---|---|---|
| Sodium Chloride | 0.3726 | 0.3726 | 0.3726 | 0.3726 |
| Potassium chloride | 0.0093 | 0.0093 | 0.0093 | 0.0093 |
| 1M Sodium Hydroxide Solution | 0.1500 | 0.1500 | 0.1500 | 0.1500 |
| Acetic Acid | 0.0019 | 0.0019 | 0.0019 | 0.0019 |
| Triton X | 0.1103 | 0.1103 | 0.1103 | 0.1103 |
| Deionized water | 97.7729 | 97.7728 | 97.3739 | 97.3738 |

Test 1: Determination of the minimum cresyl acetate violet value of 0.0027% by mass. The amount added was not enough to satisfactorily stain the leukocytes, making it impossible to differentiate the types of leukocytes. Therefore, the composition was disapproved.

Test 2: Determination of the minimum cresyl acetate violet value of 0.0028% by mass. The added amount stained the leukocytes to the minimum point that allowed differentiation of the different types of leukocytes. So, the composition was approved.

Test 3: Determination of the maximum value of cresyl acetate violet of 0.4017% by mass. This amount satisfactorily stained the erythrocytes, allowing their differentiation, and the composition remained stable without forming precipitates that interfered with the analysis. So, the composition was approved.

Test 4: Determination of cresyl violet maximum value 0.4018% acetate by mass. The excessive amount of the dye reduced the stability time of the final composition, initiating the formation of precipitates that negatively interfered with the analysis. Therefore, the composition was disapproved.

Tests 5 to 7 determined the minimum and maximum amount of absolute ethyl alcohol are listed in table 2.

TABLE 2

Tests 5 to 7 to determine the amounts in % by mass of Absolute Ethyl Alcohol.

| Component | 5 | 6 | 7 |
|---|---|---|---|
| Violet Cresyl Acetate | 0.0060 | 0.0060 | 0.0060 |
| Ethyl alcohol | 0.0000 | 34.7379 | 34.7380 |
| Sodium Chloride | 0.3726 | 0.3726 | 0.3726 |
| Potassium chloride | 0.0093 | 0.0093 | 0.0093 |
| 1M Sodium Hydroxide Solution | 0.1500 | 0.1500 | 0.1500 |
| Acetic Acid | 0.0019 | 0.0019 | 0.0019 |
| Triton X | 0.1103 | 0.1103 | 0.1103 |
| Deionized water | 99.3499 | 64.612 | 64.6119 |

Test 5: Determination of the minimum value of absolute ethyl alcohol of 0% by mass. The final composition showed minimally satisfactory performance with the absence of ethyl alcohol against the stability of the dye solution. Therefore, the composition was approved.

Test 6: Determination of the maximum value of absolute ethyl alcohol of 34.7379% by mass. This amount of absolute ethyl alcohol improved the stability of the dye solution, and the morphological changes were negligible in the analysis. So, the composition was approved.

Test 7: Determination of the maximum value of absolute ethyl alcohol of 34.7380% by mass. The greater amount of ethyl alcohol maintained the good stability of the solution, however morphological changes of the cells significantly increased. Therefore, this composition was disapproved.

Tests 8 to 10 determined the minimum and maximum amount of sodium chloride are listed in table 3.

TABLE 3

Tests 8 to 10 to determine the amounts in mass % of Sodium Chloride.

| Component | 8 | 9 | 10 |
|---|---|---|---|
| Violet Cresyl Acetate | 0.0060 | 0.0060 | 0.0060 |
| Ethyl alcohol | 1.5803 | 1.5803 | 1.5803 |
| Sodium Chloride | 0.0000 | 0.7913 | 0.7914 |
| Potassium chloride | 0.0093 | 0.0093 | 0.0093 |
| 1M Sodium Hydroxide Solution | 0.1500 | 0.1500 | 0.1500 |
| Acetic Acid | 0.0019 | 0.0019 | 0.0019 |
| Triton X | 0.1103 | 0.1103 | 0.1103 |
| Deionized water | 98.1422 | 97.3509 | 97.3508 |

Test 8: Determination of the minimum amount of sodium chloride of 0% by mass. The final composition had satisfactory functioning with the absence of this salt, although it was noted the presence of background residues, which did not interfere in the analysis. So, the composition was approved.

Test 9: Determination of the maximum amount of sodium chloride of 0.7913% by mass. The addition of sodium chloride in this amount considerably reduced the amount of background residues generated by the lysis of erythrocytes. So, the composition was approved.

Test 10: Determination of the maximum amount of sodium chloride of 0.7914% by mass. The excessive amount of sodium chloride reduced the amount of background residues, but the erythrocytes stopped were lysed, negatively affecting the analysis. Therefore, the composition was disapproved.

Tests 11 to 13 determined the minimum and maximum amount of Potassium Chloride are listed in table 4.

TABLE 4

Tests 11 to 13 to determine the amounts in % by mass of Potassium Chloride.

| Component | 11 | 12 | 13 |
|---|---|---|---|
| Violet Cresyl Acetate | 0.0060 | 0.0060 | 0.0060 |
| Ethyl alcohol | 1.5803 | 1.5803 | 1.5803 |
| Sodium Chloride | 0.3726 | 0.3726 | 0.3726 |
| Potassium chloride | 0.0000 | 0.9835 | 0.9836 |
| 1M Sodium Hydroxide Solution | 0.1500 | 0.1500 | 0.1500 |
| Acetic Acid | 0.0019 | 0.0019 | 0.0019 |
| Triton X | 0.1103 | 0.1103 | 0.1103 |
| Deionized water | 97.7789 | 96.7954 | 96.7953 |

Test 11: Determination of the minimum amount of potassium chloride of 0% by mass. The final composition had satisfactory functioning with the absence of this salt, although it was noted the presence of background residues, which did not interfere in the analysis. So, the composition was approved.

Test 12: Determination of the maximum amount of potassium chloride of 0.9835% by mass. The addition of potassium chloride in this amount considerably reduced the amount of background residue generated by the lysis of erythrocytes. So, the composition was approved.

Test 13: Determination of the maximum amount of potassium chloride of 0.9836% by mass. The excessive amount of potassium chloride reduced the amount of background residues, however the erythrocytes stopped were lysed, negatively affecting the analysis. Therefore, the composition was disapproved.

Tests 14 to 16 determined the minimum and maximum amount of 1M sodium hydroxide solution are listed in table 5.

TABLE 5

Tests 14 to 16 to determine the amounts in % by mass of 1M Sodium Hydroxide Solution.

| Component | 14 | 15 | 16 |
|---|---|---|---|
| Violet Cresyl Acetate | 0.0060 | 0.0060 | 0.0060 |
| Ethyl alcohol | 1.5803 | 1.5803 | 1.5803 |
| Sodium Chloride | 0.3726 | 0.3726 | 0.3726 |
| Potassium chloride | 0.0093 | 0.0093 | 0.0093 |
| 1M Sodium Hydroxide Solution | 0.0000 | 0.4949 | 0.4950 |
| Acetic Acid | 0.0019 | 0.0019 | 0.0019 |
| Triton X | 0.1103 | 0.1103 | 0.1103 |
| Deionized water | 97.9196 | 97.4247 | 97.4246 |

Test 14: Determination of the minimum amount of sodium hydroxide solution (1M) of 0% by mass. The final composition showed satisfactory behavior in the absence of this sodium hydroxide solution. So, the composition was approved.

Test 15: Determination of the maximum amount of sodium hydroxide solution (1M) of 0.4949% by mass. Considerable improvements in erythrocyte lysis were noted and also the composition showed good stability. So, the composition was approved.

Test 16: Determination of the maximum amount of sodium hydroxide solution (1M) of 0.4950% by mass. There was lysis of the erythrocytes and good stability of the final composition, however, the process of changing the leukocyte morphology began, which is undesirable for the analysis. Therefore, the composition was disapproved.

Tests 17 to 19 determined the minimum and maximum amount of Glacial Acetic Acid are listed in table 6.

TABLE 6

Tests 17 to 19 to determine amounts in % by mass of Glacial Acetic Acid.

| Component | 17 | 18 | 19 |
|---|---|---|---|
| Violet Cresyl Acetate | 0.0060 | 0.0060 | 0.0060 |
| Ethyl alcohol | 1.5803 | 1.5803 | 1.5803 |
| Sodium Chloride | 0.3726 | 0.3726 | 0.3726 |
| Potassium chloride | 0.0093 | 0.0093 | 0.0093 |
| 1M Sodium Hydroxide Solution | 0.1500 | 0.1500 | 0.1500 |
| Acetic Acid | 0.0000 | 0.4154 | 0.4155 |
| Triton X | 0.1103 | 0.1103 | 0.1103 |
| Deionized water | 97.7715 | 97.3561 | 97.3560 |

Test 17: Determination of the minimum amount of acetic acid of 0% by mass. The final composition worked well in the absence of acetic acid, although some background residues generated by the lysis of erythrocytes were noted, which did not negatively affect the analysis. So, the composition was approved.

Test 18: Determination of the maximum amount of acetic acid of 0.4154% by mass. Significant improvements in the lysis of erythrocytes and also reduction of background residues generated by the lysis of erythrocytes were verified, in addition to the leukocytes being satisfactorily stained. So, the composition was approved.

Test 19: Determination of the maximum amount of acetic acid of 0.4155% by mass. Although the erythrocytes were lysed and the background residue was reduced, the leukocytes were not minimally stained for the proper conduct of the analysis. Therefore, the composition was disapproved.

Tests 20 to 23 determined the minimum and maximum amount of Triton X (t-Octylphenoxypolyethoxyethanol) are listed in table 7.

TABLE 7

Tests 20 to 23 for determination of amounts in % by mass of Triton X.

| Component | 20 | 21 | 22 | 23 |
|---|---|---|---|---|
| Violet Cresyl Acetate | 0.0060 | 0.0060 | 0.0060 | 0.006 |
| Ethyl alcohol | 1.5803 | 1.5803 | 1.5803 | 1.5803 |
| Sodium Chloride | 0.3726 | 0.3726 | 0.3726 | 0.3726 |
| Potassium chloride | 0.0093 | 0.0093 | 0.0093 | 0.0093 |
| 1M Sodium Hydroxide Solution | 0.1500 | 0.1500 | 0.1500 | 0.15 |
| Acetic Acid | 0.0019 | 0.0019 | 0.0019 | 0.0019 |
| Triton X | 0.0955 | 0.0956 | 1.0527 | 1.0528 |
| Deionized water | 97.7844 | 97.7843 | 96.8272 | 96.8271 |

Test 20: Determination of the minimum amount of Triton X of 0.0955% by mass. The insufficient amount of this surfactant caused the lysis of erythrocytes to cease to occur. Therefore, the composition was disapproved.

Test 21: Determination of the minimum amount of Triton X of 0.0956% by mass. This amount initiated satisfactory erythrocyte lysis. So, the composition was approved.

Test 22: Determination of the maximum amount of Triton X of 1.0527% by mass. There was lysis of erythrocytes and other cells relevant to the analysis remained in good condition. So, the composition was approved.

Test 23: Determination of the maximum amount of Triton X of 1.0528% by mass. The excessive amount of this surfactant lysed all the cells in the sample, which prevented the visualization and counting of white blood cells. Therefore, the composition was disapproved.

Tests 24 to 27 determined the minimum and maximum amount of Deionized Water are listed in table 8.

TABLE 8

Tests 24 to 27 to determine the amounts in % by mass of Deionized water.

| Component | 24 | 25 | 26 | 27 |
|---|---|---|---|---|
| Violet Cresyl Acetate | 0.3000 | 0.3000 | 0.0050 | 0.0050 |
| Ethyl alcohol | 33.2401 | 33.2400 | 0.3929 | 0.3928 |
| Sodium Chloride | 0.7000 | 0.7000 | 0.0087 | 0.0087 |
| Potassium chloride | 0.9000 | 0.9000 | 0.0060 | 0.0060 |
| 1M Sodium Hydroxide Solution | 0.4000 | 0.4000 | 0.1000 | 0.1000 |
| Acetic Acid | 0.4000 | 0.4000 | 0.0093 | 0.0093 |
| Triton X | 1.0000 | 1.0000 | 0.0990 | 0.0990 |
| Deionized water | 63.0599 | 63.0600 | 99.3791 | 99.3792 |

Test 24: Determination of the minimum amount of deionized water of 63.0599% by mass. The high concentration of the final composition caused all the cells to be lysed, which made it impossible to visualize and count the leukocytes. Therefore, the composition was disapproved.

Test 25: Determination of the minimum amount of deionized water of 63.0600% by mass. Although the concentration of the final composition was still high, the leukocytes were not lysed, and analysis was possible. Therefore, the composition was approved;

Test 26: Determination of the maximum amount of deionized water of 99.3791% by mass. There was satisfactory lysis of the erythrocytes, allowing the analysis. So, the composition was approved.

Test 27: Determination of the maximum amount of deionized water of 99.3792% by mass. Erythrocytes were no longer lysed with this amount of deionized water, which negatively interfered in the analysis. Therefore, the composition was disapproved.

In summary, the minimum and maximum amounts of the mass percentages of the components for the satisfactory functioning of the final composition are listed in table 9 below:

TABLE 9

Minimum and maximum amounts of each component of the formulation in % by mass.

| Component | Minimum | Maximum |
|---|---|---|
| Violet Cresyl Acetate | 0.0028 | 0.4017 |
| Ethyl alcohol | 0.0000 | 34.7379 |
| Sodium Chloride | 0.0000 | 0.7913 |
| Potassium chloride | 0.0000 | 0.9835 |
| 1M Sodium Hydroxide Solution | 0.0000 | 0.4949 |
| Acetic Acid | 0.0000 | 0.4154 |
| Triton X | 0.0956 | 1.0527 |
| Deionized water | 63.0600 | 99.3791 |

Test 28 which determined the preferred amount of the components of the composition is listed in table 10. In this test, the final composition showed the best results in terms of cell morphology, stability, erythrocyte lysis, amount of background residue, good visualization, and good counting of leukocytes.

TABLE 10

Test 28 with preferred composition, amount in % by mass.

| | |
|---|---|
| Violet Cresyl Acetate | 0.0060 |
| Ethyl alcohol | 1.5803 |
| Sodium Chloride | 0.3726 |
| Potassium chloride | 0.0093 |
| 1M Sodium Hydroxide Solution | 0.1500 |
| Acetic Acid | 0.0019 |
| Triton X | 0.1103 |
| Deionized water | 97.7696 |

The final composition can be used in whole, venous or capillary blood, collected with anticoagulant or fresh, in the minimum volumetric ratio of 1 part of blood to 19 parts of final composition and maximum of 1 part of blood to 6 parts of final composition. After dilution, homogenization is performed, and an aliquot is transferred to a hemocytometer for reading in a Point-of-Care device for automated counting or optical microscope with objective lens of 10× or 40× magnification. This final composition was evaluated with blood from rats, dogs, cats and horses, showing good results, and can also be used for veterinary purposes. The final composition can be stored for up to 4 months, provided it is protected from light and kept at room temperature (10 to 25° C.).

The invention claimed is:

1. A formulation of dye solution for total and differential counting of leukocytes in a liquid medium for hematological analyses, capable of staining the nucleus and cytoplasm of leukocytes in different shades of purple and lysing erythrocytes in a single step, comprising deionized water in a range of 63.0600% to 99.3791% by mass, ethyl alcohol in a range of 0% to 34.7379% by mass, sodium chloride in the range of 0% to 0.7913% by mass, t-octylphenoxypolyethoxyethanol in a range of 0.0956% to 1.0527% by mass, wherein the formulation additionally comprises the following compounds in the following percentages by mass:

| Component | Minimum | Maximum |
|---|---|---|
| Violet Cresyl Acetate | 0.0028 | 0.4017 |
| 1M Sodium Hydroxide Solution | 0.0000 | 0.4949 |
| Acetic Acid | 0.0000 | 0.4154 |
| potassium chloride | 0.8000 | 0.9835 |

2. A formulation of dye solution for total and differential counting of leukocytes in a liquid medium according to claim 1, comprising 97.7696% by mass of deionized water, 1.5803% by mass of ethyl alcohol, 0.3726% by mass of sodium chloride, 0.0093% by mass of potassium chloride, 0.1103% by mass of t-octylphenoxypolyethoxyethanol and comprising the following compounds, in the following percentages by mass:

| Component | % mass |
|---|---|
| Violet Cresyl Acetate | 0.0060 |
| 1M Sodium Hydroxide Solution | 0.1500 |
| Acetic Acid | 0.0019 |

3. A method of preparation and formulation of a composition for total and differential counting of leukocytes in liquid medium, comprising the following steps:
   A1) Step of production of a dye solution, with the dilution of cresyl acetate violet dye in anhydrous ethyl alcohol; then the resulting dilution is kept for 1 hour, protected from light; then filtered through filter paper No. 1 or No. 5; then deionized water is added to the dilution;
   A2) Step of producing a hemolyzing solution, with the dilution of sodium chloride (NaCl) and potassium chloride (KCl) in deionized water, followed by the addition of 1M sodium hydroxide solution (1 molar), glacial acetic acid and t-octylphenoxypolyethoxyethanol; then the solution is homogenized on a thermal magnetic plate heated to 50° C., until the complete dilution of all components; and
   A3) Step of preparation of the composition by mixing 1 part by volume of the dye solution with 9 parts by volume of the hemolyzing solution; buffering to a pH between 4.0 and 6.0 ration; and storing the composition protected from light.

4. A method of counting leukocytes in an animal blood sample comprising the steps of diluting and homogenizing the blood sample in the formulation according to claim 1 to obtain a mixture, and inserting the mixture into a hemocytometer for evaluation under an optical microscope.

* * * * *